Figure 1:
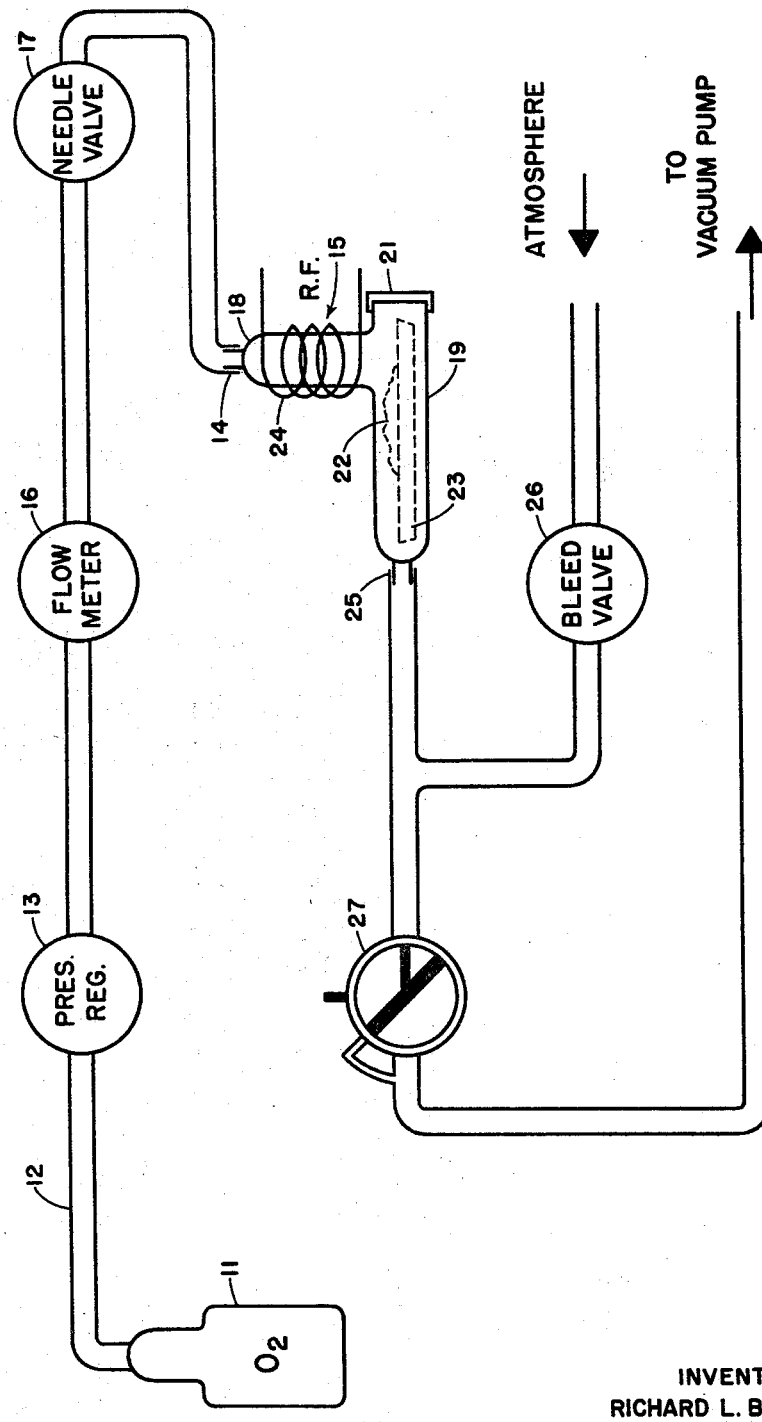

INVENTOR
RICHARD L. BERSIN
BY
Robert S. Toperzer

United States Patent Office 3,410,776
Patented Nov. 12, 1968

3,410,776
GAS REACTION APPARATUS
Richard Bersin, Berkeley, Calif., assignor to Laboratory for Electronics, Inc., Boston, Mass., a corporation of Delaware
Filed Feb. 1, 1966, Ser. No. 524,103
3 Claims. (Cl. 204—193)

This invention relates to apparatus for chemically altering a non-gaseous substance by reacting it with a gas, the same being particularly useful in the decomposition of organic samples for purposes of analysis.

In co-pending application Ser. No. 215,348 filed Aug. 7, 1962, now abandoned, in the names of Robert M. Main and Chester E. Gleit, and entitled Gas Reaction System, there is a disclosed apparatus of the above-mentioned character which is capable of inducing reactions of a substance with a gas at relatively low temperature and without contamination of the substance. By virtue of this capability undesired side reactions are avoided, and also, sought-after products are less likely to be lost by volatizing or absorption into the walls of the reaction cell. Broadly speaking, the mechanism disclosed in the aforementioned application for realizing these advantages is the activation of a gas, such as oxygen, by means of a radio frequency (RF) field. The field is produced by an RF coil surrounding a reaction cell into which the oxygen is fed at relatively low pressure. As a result, ionization of the oxygen takes place which, it has been found, greatly enhances the efficiency of the reaction between the gas and the substance under analysis. Unreacted oxygen and other gaseous products can be withdrawn by the provision of an outlet from the cell which is connected to an exhaust pump.

In accordance with the present invention, which can be regarded as an improvement upon this apparatus, still greater efficiency is obtained, and also the tendency of the substance to spatter is greatly reduced which substantially eliminates a major source of loss of the desired product. The improved apparatus of the present invention makes use of a cell with a chamber for activating the gas which is distinct from the chamber in which the sample substance is placed, and in addition, features an RF shield around the latter chamber. In this way, the RF field is constrained to act on the gas to activate it prior to its exposure to the substance to be decomposed or otherwise chemically altered. Yet, the substance in the sample chamber is disposed sufficiently close to the region where the gas is activated so that recombination of the activated species of the gas does not take place prior to the reaction with the substance.

Accordingly, the general object of the present invention is to provide more efficient reactions between a gas and a liquid or solid substance at relatively low temperature and without the introduction of contaminants.

A more specific object is to provide an improved form of reaction cell for accomplishing the foregoing general object without appreciable loss of desired reaction products.

Figure 2:
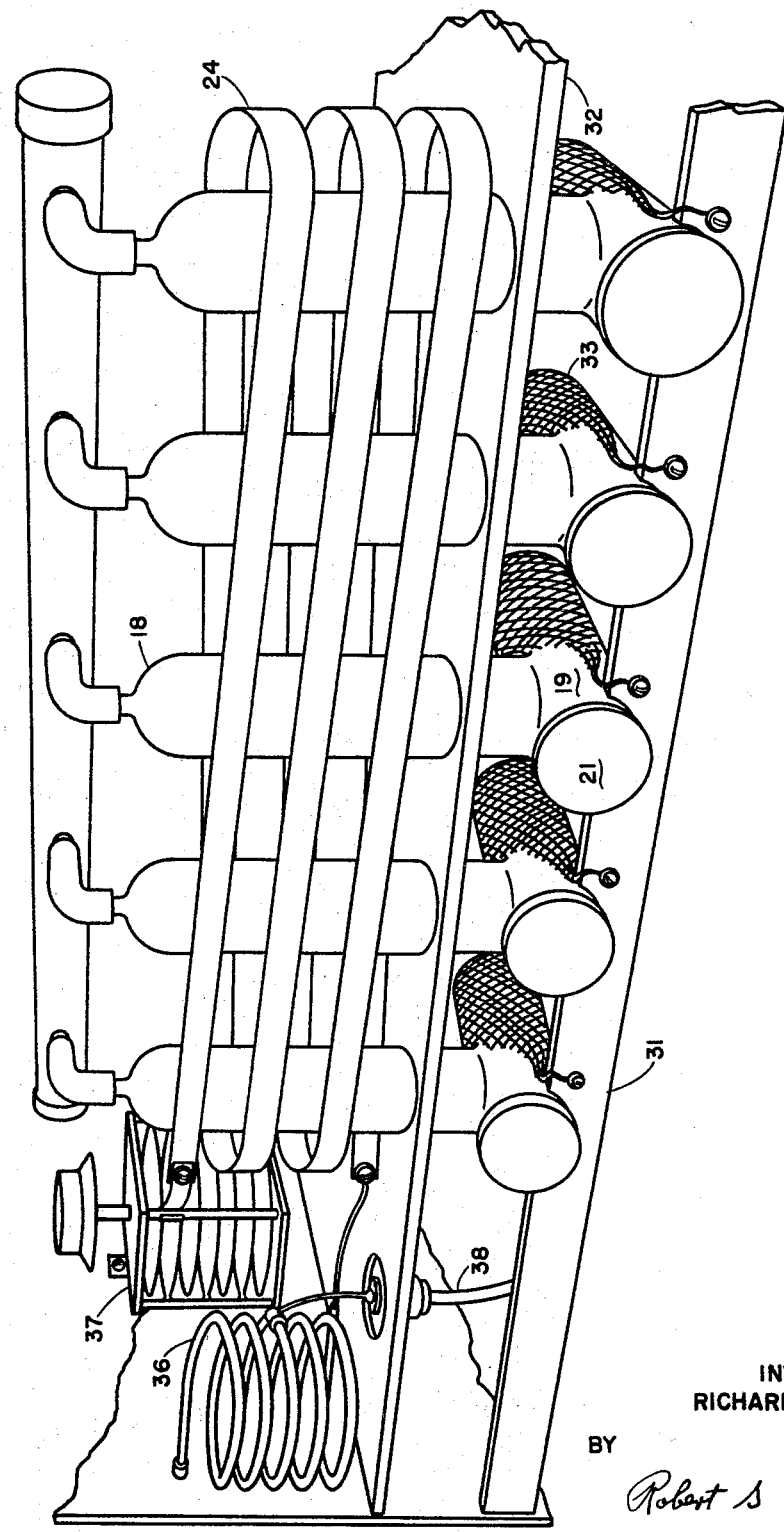

The novel features of the present invention together with further objects and advantages will become apparent from the following detailed description of a preferred embodiment and from the accompanying drawings to which the description refers. In the drawing:

FIG. 1 is a diagrammatic representation of the apparatus in accordance with the present invention; and, FIG. 2 is a perspective view of the salient parts of the apparatus.

With reference now to the drawings and more particularly to FIG. 1, it will be observed that the numeral 11 designates a container of molecular gas such as oxygen. In the outlet line 12 from the gas container, there is a pressure regulating valve 13, which may be provided as an integral part of the container as is usual in the case of commercial containers for oxygen and other commonly used gases. Valve 13, on its outlet side, is connected to the inlet 14 of a reaction cell 15. Also, there is a flow meter 16 and a needle valve 17 in the line between the valve 13 and the inlet to the cell.

The cell itself, as shown diagrammatically in FIG. 1, includes a first chamber portion 18 for activation of the gas and a second chamber portion 19 to receive a sample of the substance to be reacted with the gas. For the purpose of loading the sample chamber 19, there is provided an opening to the chamber at its end adjacent the chamber 18. This opening is provided with a closure in the form of a cover 21 which is adapted to fit tightly over the opening. Preferably, the sample 22 is placed upon a boat 23 before it is inserted into the sample chamber for ease of handling and recovery. For activating the gas, there is provided an RF coil 24 surrounding the chamber. As will appear from FIG. 2 the showing of the coil in FIG. 1 is diagrammatic only in that the physical configuration of the coil will be governed in part by the number of cells to be served by it. That is to say, in FIG. 2 to be described hereinafter, a single coil is employed to activate the gas in several cells simultaneously.

With reference further to FIG. 1, it will be observed that there is an outlet from the cell designated 25, the same being located at the end of the sample chamber portion remote from chamber 18. Outlet 25, in turn, is connected to the atmosphere through a bleed valve 26, and to a source of vacuum such as a vacuum pump through a control valve 27. As shown diagrammatically, control valve 27 has 3 positions, a full-open position, a slightly-open position, and a full-closed position. The orientation of the valve in FIG. 1 is such that the valve is slightly open.

The physical form taken by a preferred embodiment of the apparatus is shown in detail in FIG. 2. By way of example, the apparatus as shown in FIG. 2 is provided with five reaction cells 15 so that any number of reaction processes up to five can be carried out simultaneously. The chamber portions of each of the cells are seen to be generally cylindrical, with chamber portion 18 extending in the vertical direction and chamber portion 19 in the horizontal. That is to say, the two chamber portions which go to make up the cell are joined at right angles to one another in an L configuration with the opening to the sample chamber more closely adjacent the chamber 18 for activating the gas. The cells are disposed side by side and to maintain them in place, chamber portions 19 are cradled in a frame member 31 while the chamber portions 18 extend through clearance holes in a plate 32. Each of the sample chambers is also provided with an RF shield in the form of a wire mesh screen 33 covering the outer wall of its associated chamber. Each of the screens 33 is electrically connected to the frame member 31 which, together with plate 32, forms an integral part of the electrical ground for the system. Coil 24 is seen to have three turns, with each turn taking the form of a rigid ribbon of conductive materials, such as copper, which extends around all of the cells as a group. If the first turn be regarded as the one which begins at the top, as shown in the drawing, the conductive ribbon passes along the front side of each of the chambers 18, makes a 180° turn toward the right of the drawing, and then returns along the back sides of the chambers 18. One end of the coil is connected to the high side of an impedance matching transformer 36 while the other end of the coil is connected to the stationary plates of a variable capacitor 37. The movable plates of the capacitor are grounded as is the end of the transformer coil remote from the connection to the coil 24 for activating the gas. Finally, the feed to the coil 36 is accomplished by means of a shielded cable 38 which has its inner conductor connected to the coil in the vicinity of its mid point.

In operation, the system is first pumped down by withdrawing air and residual gas by way of the line from the outlet side of the control valve 27. If a fast pump down is desired, valve 27 is set to its full-open position. If not, the position shown in FIG. 1 is appropriate. An even slower pump-down rate can be achieved by the opening of bleed valve 26 to bypass the cell to the atmosphere. After a desired vacuum has been attained, the main control valve for the container of gas 11 is opened. Although this control valve has not been separately shown in the drawings, it will be understood that the same is normally teo be found on the container 11 as in the case of pressure regulating valve 13. Finally, the flow rate of the gas, as indicated by meter 16, is adjusted by means of needle valve 17.

To activate the gas a radio frequency oscillator (not shown) is enabled to supply RF energy to the coil 24. By way of example, an oscillator having an output frequency in the neighborhood of 13 megacycles per second and a power output of 300 watts has been found to work out well in actual practice. It is significant in this regard, however, that the tuning of the resonant circuit formed with the coil 24 and capacitor 37, which acts as the load on the oscillator, depends on the presure in the cells and to some extent upon their contents. Accordingly, to optimize the power transfer from the oscillator to the gas by means of the RF field created by the coil 24, it is required to make a final tuning adjustment of the capacitor 37. This adjustment is made with regard to the degree of ionization of the gas, a maximum ionizing effect being taken as an indication of maximum power transfer. With the system thus in operation, the radio frequency field produces active species of the incoming molecular gas such as, for example, atomic oxygen. These are introduced to the substance in sample chamber 19 before appreciable recombination can take place. As a result, reaction efficiency is greatly enhanced without the need for a high temperature environment. It is also significant in this regard that by virtue of the RF shield, the RF field is prevented from acting directly upon the contents of the sample chamber 19. This, it has been found, substantially eliminates spattering of the substance and at the same time further increases the efficiency of the reaction. By way of example, the apparatus is particularly useful for the combustion of organic material such as biological tissue, filter papers or ion exchange resins.

Although the invention has been described with reference to a single preferred embodiment which includes five reaction cells, it will be understood that the number of cells provided is entirely optional. So to in the case of the RF field, the means for generating the field can take various optional forms. Therefore, the invention should not be deemed to be limited to the details of what has been described herein by way of example, but rather it should be deemed to be limited only by the scope of the appended claims.

What is claimed is:

1. Apparatus for reacting a gas with a non-gaseous substance comprising: a reaction cell having a first chamber portion for activation of the gas and a second chamber portion to contain the substance which is to be exposed to the activated gas, means to introduce the gas into said cell by way of said first chamber portion, means to create an RF field which ionizes the gas in said first chamber poriton to activate it, means to withdraw gas from said cell by way of said second chamber portion, and an RF shield surrounding said second chamber portion to prevent said field from acting directly upon the contents of said second chamber portion.

2. Apparatus as claimed in claim 1 wherein said chamber portions have a generally cylindrical shape and are joined to one another at right angles in an L configuration.

3. Apparatus as claimed in claim 2 wherein said means to create an RF field includes an inductor disposed about said first chamber portion and said RF shield comprises a screen of wire mesh surrounding the outer wall of said second chamber portion, said second chamber portion being provided with a removable closure at its end adjacent to said first chamber for inserting and removing the substance.

References Cited

UNITED STATES PATENTS

| | | | |
|---|---|---|---|
| 2,945,797 | 7/1960 | Cherrier | 204—164 |
| 3,005,762 | 10/1961 | Fenn | 204—164 |

FOREIGN PATENTS

| | | |
|---|---|---|
| 697,223 | 9/1953 | Great Britain. |

HOWARD S. WILLIAMS, *Primary Examiner.*